E. G. FISCHER & H. C. WEHMANN.
HINGED TRANSPARENT COVER.
APPLICATION FILED DEC. 31, 1915.
1,199,774.
Patented Oct. 3, 1916.
2 SHEETS—SHEET 1.
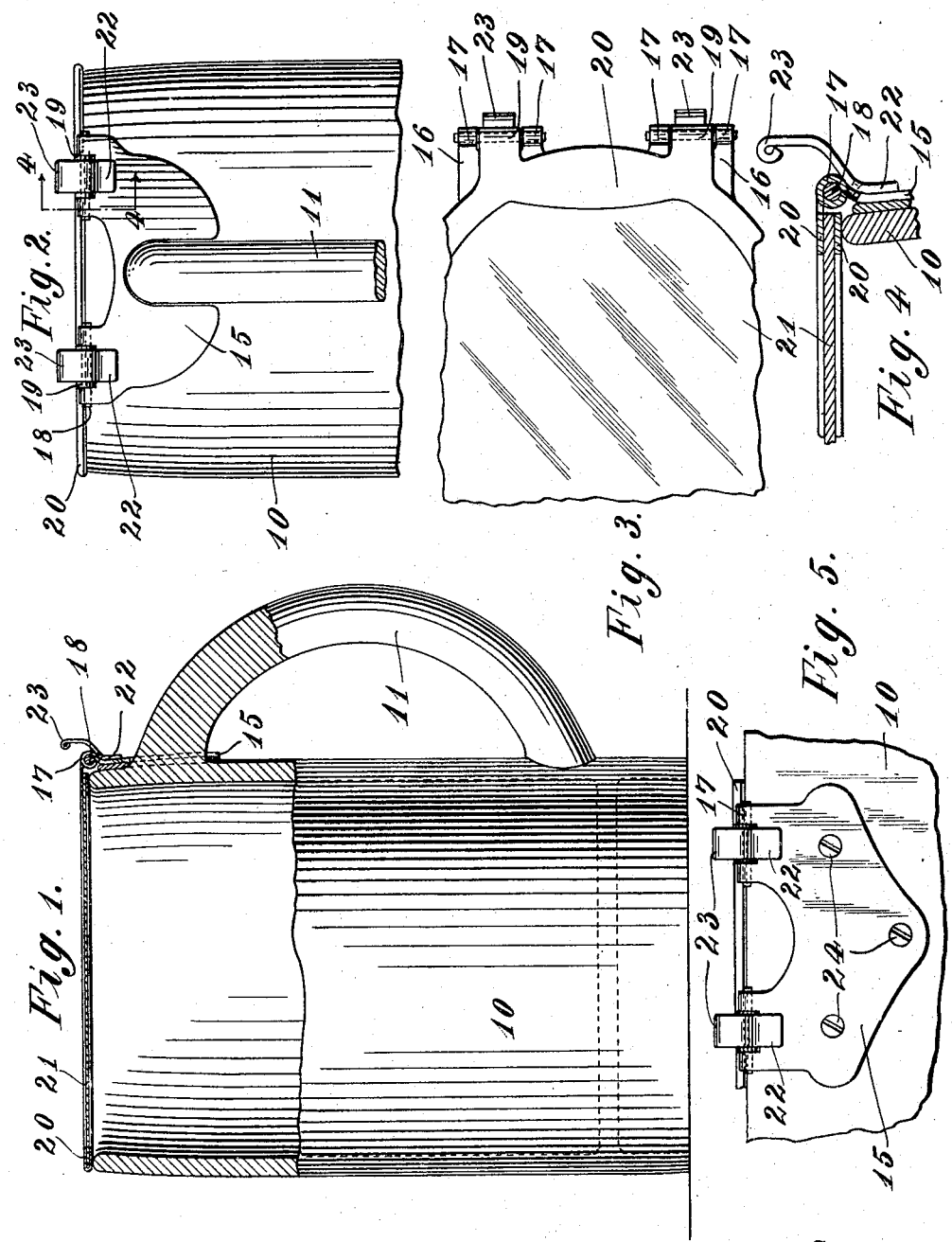
Witnesses:
Richard Wegener
Lulu A. Kohlmann
Inventors
Ernest G. Fischer
Heinrich Conrad Wehmann
By their Attorney
Oscar Geier

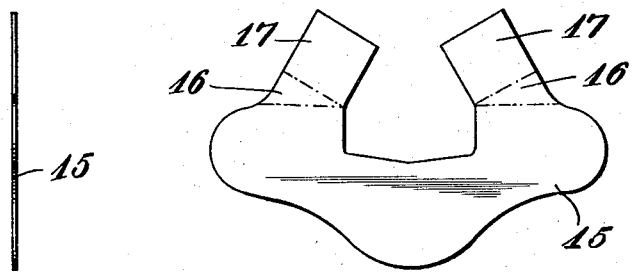
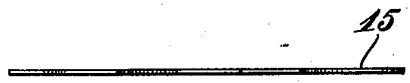
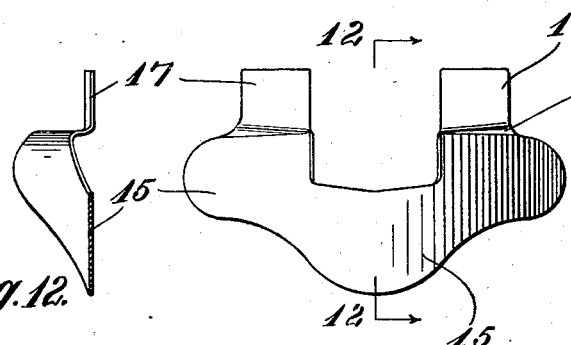
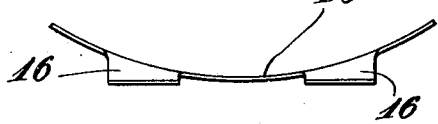
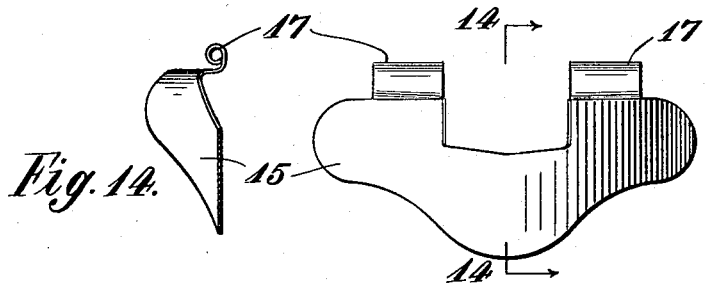

UNITED STATES PATENT OFFICE.

ERNEST G. FISCHER AND HEINRICH CONRAD WEHMANN, OF NEW YORK, N. Y.

HINGED TRANSPARENT COVER.

1,199,774.     Specification of Letters Patent.    Patented Oct. 3, 1916.

Application filed December 31, 1915. Serial No. 69,664.

*To all whom it may concern:*

Be it known that we, ERNEST G. FISCHER, a citizen of the United States, and HEINRICH CONRAD WEHMANN, a subject of the Emperor of Germany, and residents of New York, in the county of New York and State of New York, have invented certain new and useful Improvements in Hinged Transparent Covers, of which the following is a specification.

This invention relates to improvements in covers for small vessels such as are used in dispensing beverages, either hot or cold, and has as its principal object the provision of means whereby a cover may be attached preventing the escape of aroma rising from the beverage and also precluding the entrance of insects, dust and the like which may be floating in the air or drop from above.

A further object is to provide such devices in forms that may be applied to any ordinary vessel of the kind, whether it be provided with a handle or not, and which in no wise interferes with its customary use, or obstructs the filling or dispensing of the contents.

A still further object is the amplification of cover improvements as set forth in a co-pending application for patent, filed December 13th, 1915, Serial No. 66480.

These and other objects are attained by the novel construction and combination of parts hereafter described and shown in the accompanying drawing, forming part of this specification, and in which:—

Figure 1 is a side elevation of a handled tankard, mug or stein, partially in section, showing an application of the invention. Fig. 2 is a partial rear view of the same. Fig. 3 is a partial top plan view of the same. Fig. 4 is a fragmentary sectional view, taken on line 4—4 of Fig. 2, showing the upper portion of the device. Fig. 5 is a view showing a modified form of attachment, and Fig. 6 is a plan view of the blank used in forming the attaching plates. Fig. 7 is a top plan view of the blank. Fig. 8 is an end view thereof. Fig. 9 is another top plan view showing the blank open in conformity with the contour of the vessel. Fig. 10 is a front plan view of the blank after its projection, having been bent angularly. Fig. 11 is a top plan view of the same. Fig. 12 is a sectional view taken on line 12—12 of Fig. 10. Fig. 13 is a front elevation of a blank showing its final form, the hinges being shaped, and Fig. 14 is a vertical sectional view taken on line 14—14 of Fig. 13.

The vessel shown indicates a common form of mug 10, provided with a handle 11, formed integrally with the body of the mug.

A plate 15 is secured to the exterior of the mug, preferably having an opening into which the handle extends, and formed with outwardly turned members 16, terminating in rounded loops 17; the wires 18, passing through the encircling loops carry similar loops 19, forming in effect hinges, the axes of which are substantially in a plane tangent to the outer wall of the mug, and slightly above its upper edge, so that when raised the entire area of its opening is presented. These loops 19 are formed integral with the frame 20, inclosing a plate 21, preferably transparent and through which the contents of the mug are plainly visible. Thus it will be seen that the hinges are of integral, one piece, construction with the plate 15 and frame 20.

Attached adjacent to the ends of the upper portion of the plate 15 are ears or lugs 22, bent to extend upward and outward and formed with beaded ends 23, acting as stops against which the cover makes contact when raised to its full extent.

It is obvious that in place of stops, formed as above, stop elements may be formed with the frame hinge elements if it be preferred.

In the adaptation shown in Fig. 5, the plate 15 is shown to be shield shaped and held to the mug by means of screws or rivets 24, but in all other respects the construction is the same as that described above.

In Fig. 6 is shown a blank plate before bending, such as is used for the support of the cover, and from it may be seen the lugs or ears which are afterward formed into the hinge loops 17 and here designated as 17′, no additional parts being used.

The operation of the cover will be obvious from the foregoing and inspection of the drawing, therefore no extended description is required.

Having thus described our invention and indicated the manner of its application and use, what we claim as new and desire to secure by Letters Patent, is:—

In a vessel cover, the combination with a bracket, suited to the contour of the vessel and engageable therewith, of a circular frame adapted to rest on the top of the vessel along the edges thereof, a flat transparent plate inclosed in said frame, and a pair of relatively widely spaced hinges, the leaves of which are formed integrally with said bracket and frame respectively.

Signed at New York, in the county of New York, and State of New York, this 14th day of December, A. D. 1915.

ERNEST G. FISCHER.
HEINRICH CONRAD WEHMANN.

Copies of this patent may be obtained for five cents each, by addressing the "Commissioner of Patents, Washington, D. C."